United States Patent [19]
Andreasson et al.

[11] Patent Number: 4,650,000
[45] Date of Patent: Mar. 17, 1987

[54] ACIDIZING METHOD USING MICROEMULSION

[75] Inventors: Eva M. Andreasson, Göteborg, Sweden; Finn Egeli, Stavanger, Norway; Krister A. Holmberg, Mölndal, Sweden; Börje Nyström, Knivsta, Sweden; Kjell G. Stridh, Vänersborg, Sweden; Eva M. Österberg, Göteborg, Sweden

[73] Assignees: Berol Kemi AB, Stenungsund, Sweden; Tendex Kjemiservice A/S, Stavanger, Norway

[21] Appl. No.: 795,404

[22] Filed: Nov. 6, 1985

[30] Foreign Application Priority Data

Nov. 7, 1984 [NO] Norway ................................ 844451

[51] Int. Cl.$^4$ .............................................. E21B 43/27
[52] U.S. Cl. .................................. 166/307; 252/8.553
[58] Field of Search .............................. 166/271, 307; 252/8.55 C

[56] References Cited

U.S. PATENT DOCUMENTS

| | | | |
|---|---|---|---|
| 3,343,602 | 9/1967 | Knox et al. | 166/307 |
| 3,353,603 | 11/1967 | Knight | 166/307 |
| 3,548,945 | 12/1970 | Gidley | 166/307 |
| 3,754,599 | 8/1973 | Hummel et al. | 166/307 X |
| 3,831,679 | 8/1974 | Presley et al. | 166/307 |
| 3,921,718 | 11/1975 | Tate | 166/307 |
| 4,140,640 | 2/1979 | Scherubel | 166/307 X |
| 4,233,165 | 11/1980 | Salathiel et al. | 166/271 X |
| 4,322,306 | 3/1982 | Dill | 166/307 X |
| 4,595,512 | 6/1986 | Tellier et al. | 166/307 X |

FOREIGN PATENT DOCUMENTS 2022653 12/1979 United Kingdom .
2074043 10/1981 United Kingdom .

Primary Examiner—George A. Suchfield
Attorney, Agent, or Firm—Watson, Cole, Grindle & Watson

[57] ABSTRACT

Formations surrounding oil wells, gas wells, injection wells and similar bore holes are treated by the injection of a microemulsion containing an acid solution. The main surfactant of the microemulsion is characterized by having at least two hydrocarbon groups attached to a nitrogen atom via a polar groups.

8 Claims, No Drawings

ACIDIZING METHOD USING MICROEMULSION

BACKGROUND OF THE INVENTION

1. Field of the Invention

The present invention relates to the treatment of formations surrounding oil wells, gas wells, injection wells and similar boreholes by the injection of a microemulsion containing an aqueous acid solution.

2. The Prior Art

Basically, all well treatments involve the injection of a fluid into an oil or gas well to stimulate production from the well. The most widely used stimulation technique is hydraulic fracturing, in which a fracturing fluid is injected into a well under pressure to propagate a fracture adjacent to the well. Another widely used stimulation method is acidizing, in which an acidic fluid is introduced into the formation to dissolve formation rock. One acidizing technique is known as matrix acidizing, whereby an acid is injected into the formation to etch into the pore spaces.

In matrix acidizing, the acid-bearing fluid is slowly injected into the formation so that the acid can permeate into channels that have been clogged or constricted with clays or formation fines. The acid dissolves the hindering material, thereby increasing permeability. Tests have shown that the degree of stimulation afforded by the matrix acidizing is strongly dependent upon the extent of acid penetration into the formation.

One method described in British Pat. No. 2 022 653 for providing deep acid penetration involves the use of an emulsion comprising an oil external phase and an acid internal phase. The external oil phase apparently shields the acid from the formation materials and thereby permits unreacted acid to penetrate deeper into the formation.

Relatively recently, microemulsions have been suggested as a means of transporting the acid into the formation. This seems to be an attractive approach since microemulsions are generally known to have very good transport properties into a variety of porous materials. One of the reasons for the good penetrating power of microemulsions is their ability to give ultralow interfacial tension with both oil and aqueous phases.

With microemulsions are here meant thermodynamically stable, isotropic solutions consisting of oil, water, surfactant system and optionally other ingredients. The surfactant system usually consists of two components, the "surfactant" which is a normal type of surface active compound and the "cosurfactant", which is normally of low molecular weight and not very surface active. The most commonly used cosurfactants are alcohols such as butanol and pentanol.

Microemulsions have originally been classified as water in oil (w/o) or oil in water (o/w) in a manner similar to what is used for macroemulsions. Recent investigations, however, have shown that many microemulsions are neither w/o nor o/w, but may best be characterized as bicontinuous.

Originally microemulsions based on anionic surfactants of the sulfonate type have been proposed in the U.S. Pat. No. 3,754,599 and U.S. Pat. No. 3,831,679. However, these microemulsions have the drawback that the surfactant reacts with the acid, forming the corresponding protonated species, i.e., the sulfonic acid. This leads to an unwanted consumption of acid, as well as to the risk of precipitation of the surfactant.

In the Britist patent application No. 2,074,043, a cationic amine surfactant is suggested as the base surfactant for making microemulsions of hydrocarbon oil and aqueous acid solution. In this case no reaction between the acid and the surfactant takes place. A cosurfactant, usually an alcohol, is also needed in an amount approximately equal to that of the surfactant.

SUMMARY OF THE INVENTION

It has now been found that the efficiency of the acidizing process is very much dependent on the structure of the cationic surfactant. More specifically, we have found that if a cationic surfactant of the type disclosed in British Pat. No. 2 074 043, i.e. one compound having the hydrocarbon group attached directly to the nitrogen atom, is replaced by an amine compound having two hydrocarbon groups, the hydrocarbon groups being attached to the nitrogen atom via a polar group, the penetrating ability of the microemulsion is considerably enhanced. Such a polar group preferably consist of carbon, hydrogen and oxygen. In a preferred embodiment of the invention the cationic surfactant has two hydrophobic nitrogen substituents which have the formula

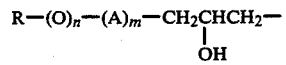

where R is a hydrocarbon group of 6–18 carbon atoms, A is an alkyleneoxy group derived from an alkylene oxide with 2–4 carbon atoms, n is 0 or 1 and m is 0–5. In many cases the acid penetration is improved even more if the surfactant contains more than one nitrogen-containing group. In such a case it is preferred that at least one nitrogen has two substituents of the formula I. The cationic groups should be close to each other. Thus, the separation on a linear chain structure is preferably less than five carbon atoms.

Illustrative but not limiting examples of the structures of the cationic surfactant according to the invention are the following:

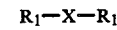

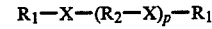

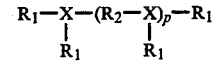

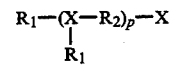

wherein
$R_1$ is hydrogen or the group

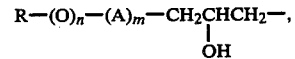

where R, A, n and m have the meaning above, with the condition that at least two $R_1$-groups are different from hydrogen, $R_2$, is a hydrocarbon residue containing from 1 to 4 carbon atoms, p is 1-3, preferably 1, and X is an ammonium group having the formula

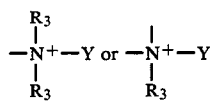

wherein R$_3$ is hydrogen, an alkyl group with 1 to 4 carbon atoms or a hydroxy alkyl group obtained by the reaction with an alkylene oxide with 2–4 carbon atoms, and Y is an anionic group which is preferably monovalent.

The ammonium group may be derived from either quarternary ammonium or protonated primary, secondary or tertiary amine. The nitrogen atoms may also have one or more substituents obtained by reactions with alkylene oxide having 2–4 carbon atoms or alkyl groups having 1–4 carbon atoms.

Compounds with two cationic groups are preferred.

The present cationic surfactants give microemulsions of oil and aqueous acid solution with an unusually good penetrating power of the acid into the formation. The reason for surfactants of this specific structure to be superior to conventional cationic surfactants is not clear. The interfacial tension between microemulsions made from these surfactants and oil or water seems not to be lower than what is obtained with other surfactants. It may be that the effect is associated with an enhanced ability of these surfactants to give well-defined w/o structures of microemulsions. The more pronounced the w/o structure of the microemulsion, the better are the chances for the acid to be transported into the formation without getting in contact with the walls of the formation channels.

In making microemulsions of hydrocarbon oil, aqueous acid solution and the special type of cationic surfactant of this invention a cosurfactant is normally employed. The cosurfactant may be chosen from those of the known prior art and particularly from the class of alcohols, ketones, ethers, amine salts and organic acid salts. Alcohols are particularly useful as cosurfactants. The alcohol may contain more than one hydroxyl group, i.e., be a diol, triol, etc. It may also contain one or more ether linkages, examples of which are the well-known polyethylene glycol ethers. The alcohol may also contain thioether linkages.

The weight ratio of surfactant to cosurfactant may vary widely, a typical range being 5:1 to 1:5 preferably 3:1 to 1:1. The total amount of surfactant system is normally between 3 and 30% by weight of the microemulsion. In some cases microemulsions may also be prepared without cosurfactant.

The hydrocarbon oil used in the process may be either natural raw oil or refined petroleum fractions. Both aliphatic and aromatic hydrocarbons, as well as mixtures of these, may be employed. The amount of hydrocarbon oil is normally from 30–90% by weight of the microemulsion.

The acids which are included in the composition of the microemulsion are inorganic acids such as hydrochloric, perchloric, sulfuric, phosphoric, hydrobromic, hydrofluoric and hydroiodic acid. The acids are normally used as aqueous 1–10M solutions. The amount of aqueous acid may vary widely but is normally between 5 and 50, preferably between 10 and 40% by weight of the microemulsion.

Microemulsions may be prepared from varying proportions of the three essential components hydrocarbon oil, aqueous acid solution and surfactant system. Depending on the ratio and type of the ingredients, different types of systems are obtained. Thus, in some cases a single phase microemulsion is obtained, whereas in other cases a microemulsion in equilibrium with either an excess water phase, an excess oil phase or simultaneously water and oil phases (i.e. a three phase system) is formed. The latter systems are commonly referred to as WINSOR type II, WINSOR type I and WINSOR TYPE III, respectively. For acidizing purposes a single phase microemulsion or a WINSOR TYPE II system is usually advantageous, however, other systems may also be applicable.

The following syntheses illustrate preparation of the cationic surfactant and the examples show the penetration of acid obtained with different surfactant systems.

Synthesis of surfactants.

In the syntheses a–f below epoxides of type I were used as starting compounds

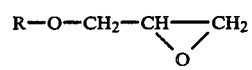

These epoxides are obtained by reaction between an alcohol and epichlorohydrin followed by treatment with alkali.

(a) Preparation of

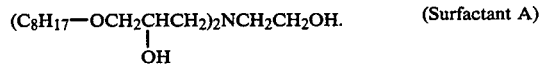

Two moles of epoxide I (R=2-ethylhexyl) and one mole of ethanolamine were mixed and heated at 60°–90° C. for 3 h.

(b) Preparation of

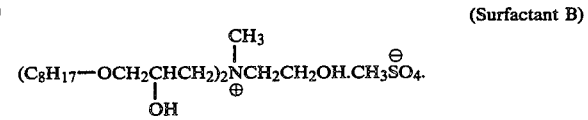

One mole of dimethylsulfate was added to one mole of surfactant A. The mixture was heated at 50°–60° C. for 3 h and then neutralized with NaOH-solution.

(c) Preparation of

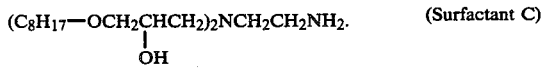

Same procedure as for surfactant A except that ethylene diamine is used instead of ethanolamine.

(d) Preparation of

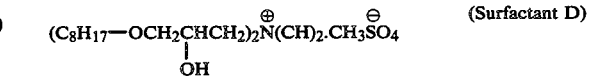

Two moles of epoxide I (R=2-ethylhexyl) were added to one mole of methyl amine in methanol by heating at 40° C. for 3 h. The tertiary amine obtained was treated with dimethyl sulphate to give surfactant D.

(e) Preparation of (Surfactant E)

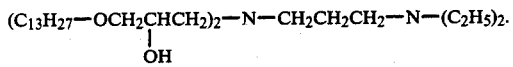

Two moles of epoxide I (R=tridecyl) and one mole of N,N-diethyl-1,3-propane diamine were mixed and heated at 60°–90° C. for 3 h.

(f) Preparation of (Surfactant F)

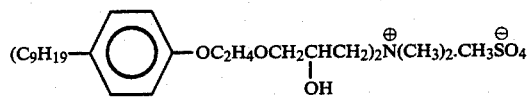

Same procedure as for surfactant D except that R of epoxide I is nonyl phenyloxyethyl instead of 2-ethylhexyl.

In the following synthesis epoxide II (commercial product from Union Carbide) was used as starting material:

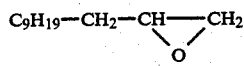  II (g) Preparation of (Surfactant G)

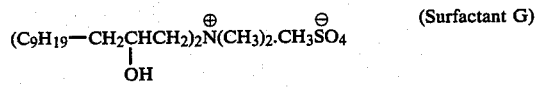

Same procedure as for surfactant D except that epoxide II was used instead of epoxide I.

EXAMPLE

The surfactants A to G above were tested with regard to penetrating ability of microemulsions in synthetic rock formation. Microemulsions were prepared according to the following recipe:

| Nonane | 55 weight % |
|---|---|
| 2 M aqueous HCl | 15 weight % |
| Surfactant | 20 weight % |
| 1-hexanol | 10 weight % |

Compounds A–G were used as surfactants. Two surfactants from the British patent application No. 2,074,043 were used as references, namely cetyl pyridinium chloride (CPC) and dioctyl dimethyl ammonium methyl sulphate (DDAMS). In addition, one control was performed in which no surfactant or cosurfactant was employed.

The solutions were injected into 200 mm long columns packed with 90% sand and 10% dolomite ($CaCO_3$). Prior to use the columns had been flushed first with formation water and then with nonane.

After injection of up to 15 pore volumes of solution, the columns were analysed with regard to $CaCO_3$ destroyed. The columns were divided into fractions, each 10 mm long, starting from the injection side. Remaining $CaCO_3$ in each fraction was determined by treatment with excess acid to react with the carbonate followed by titration with NaOH. The following results were obtained.

TABLE

| Surfactant | Remaining $CaCO_3$ (g per fraction) Fraction | | | | | | |
|---|---|---|---|---|---|---|---|
| | 1 | 2 | 3 | 4 | 5 | 6 | 7 |
| A | 3.0 | 3.5 | 3.8 | 4.2 | 4.9 | 5.6 | 5.6 |
| B | 2.4 | 3.0 | 3.4 | 3.8 | 4.3 | 4.7 | 5.5 |
| C | 2.9 | 3.2 | 3.7 | 4.4 | 4.9 | 5.4 | 5.6 |
| D | 2.7 | 3.3 | 3.6 | 4.4 | 4.7 | 5.2 | 5.5 |
| E | 3.5 | 4.5 | 4.9 | 5.3 | 5.5 | 5.6 | 5.7 |
| F | 3.0 | 4.0 | 4.5 | 5.1 | 5.2 | 5.3 | 5.4 |
| G | 2.0 | 2.5 | 3.1 | 3.4 | 4.0 | 4.9 | 5.2 |
| CPC | 0.3 | 0.7 | 1.4 | 2.4 | 3.7 | 4.6 | 5.2 |
| DDAMS | 1.1 | 1.7 | 2.0 | 2.9 | 3.9 | 4.9 | 5.4 |
| no surfactants | 0.1 | 0.5 | 1.1 | 1.9 | 3.0 | 3.8 | 5.0 |

The better the retarding effect of the acid the higher is the amount of remaining $CaCO_3$ in the initial fractions. The total amount of acid injected is the same in all experiments. It is evident that microemulsions based on surfactants A–G are considerably more efficient than those based on the reference surfactants in retarding the action of the acid.

What is claimed is:

1. A method of acid treatment of a subterranean formation containing carbonate and/or sandstone constituents, the method comprising the steps of (1) preparing a treating composition comprising a microemulsion of a hydrocarbon oil, an aqueous acid solution and a surfactant system, the main constituent of said surfactant system being a cationic, nitrogen-containing surface active compound having two hydrophobic nitrogen substituents which have the formula

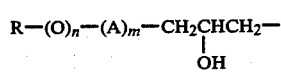  I where P is a hydrocarbon group of 16–18 carbon atoms, A is an alkyleneoxy group derived from an alkylene oxide with 2–4 carbon atoms, n is 0 or 1 and m is 0–5, and (2) applying said treating composition to said subterranean formation.

2. A method according to claim 1 wherein the cationic surface active compound contains more than one nitrogen atom.

3. A method according to claim 2, wherein the nitrogen atoms are separated by less than 5 carbon atoms.

4. A method according to claim 1, wherein the cationic surface active compound contains at least two substituents having the formula I attached to the same nitrogen atom.

5. A method according to claim 1, wherein said treating composition includes an alcohol as a cosurfactant.

6. A method according to claim 5, wherein the alcohol is an alkanol containing between 4 and 11 carbon atoms.

7. A method according to claim 5, wherein the alcohol is a glycol ether containing between 5 and 12 carbon atoms.

8. A method according to claim 5, wherein the weight ratio of cationic surface active compound to cosurfactant is between 5:1 and 1:5.

* * * * *

UNITED STATES PATENT AND TRADEMARK OFFICE
CERTIFICATE OF CORRECTION

PATENT NO. : 4,650,000

DATED : March 17, 1987

INVENTOR(S) : Eva M. Andreasson et al.

It is certified that error appears in the above-identified patent and that said Letters Patent is hereby corrected as shown below:

Column 6, line 40, replace with -- where R is a hydrocarbon group of 6-18 carbon atoms --.

Signed and Sealed this

Twenty-second Day of September, 1987

Attest:

DONALD J. QUIGG

*Attesting Officer*   *Commissioner of Patents and Trademarks*